US011368105B2

(12) United States Patent
Yamaguchi (10) Patent No.: US 11,368,105 B2
(45) Date of Patent: Jun. 21, 2022

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Toshiyuki Yamaguchi, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/272,828

(22) PCT Filed: Nov. 28, 2018

(86) PCT No.: PCT/JP2018/043739
§ 371 (c)(1),
(2) Date: Mar. 2, 2021

(87) PCT Pub. No.: WO2020/110225
PCT Pub. Date: Jun. 4, 2020

(65) Prior Publication Data
US 2021/0218345 A1 Jul. 15, 2021

(51) Int. Cl.
*H02M 7/537* (2006.01)
*H02M 7/5375* (2006.01)
(Continued)

(52) U.S. Cl.
CPC .............. *H02M 7/537* (2013.01); *H02M 1/36* (2013.01); *H02M 3/33569* (2013.01);
(Continued)

(58) Field of Classification Search
CPC ..... H02M 7/537; H02M 7/5375; H02M 7/538
See application file for complete search history.

(56) References Cited

U.S. PATENT DOCUMENTS

2010/0149844 A1* 6/2010 Yasuda ................... H02M 1/36
363/95
2016/0204597 A1* 7/2016 Hotta .................... H02M 1/088
307/131
(Continued)

FOREIGN PATENT DOCUMENTS

JP        2-164275 A     6/1990
JP        6-315201 A    11/1994
(Continued)

OTHER PUBLICATIONS

International Search Report dated Feb. 12, 2019 in PCT/JP2018/043739 filed on Nov. 28, 2018, citing references AP-AS therein, 2 pages.

*Primary Examiner* — Gary A Nash
(74) *Attorney, Agent, or Firm* — Oblon, McClelland, Maier & Neustadt, L.L.P.

(57) ABSTRACT

A power conversion device of an embodiment includes a power conversion unit, a first capacitor, a gate circuit, a bypass circuit, and a discharging circuit. The power conversion unit includes a plurality of switching elements each having a gate and generates alternating current (AC) power from direct current (DC) power supplied to a provided DC input terminal. The first capacitor is provided on a DC input side of the power conversion unit. The gate circuit includes a drive circuit configured to output a gate drive signal to be supplied to gates of one or more switching elements among the plurality of switching elements and a second capacitor configured to smooth a power supply voltage of power to be supplied to the drive circuit. The bypass circuit causes the second capacitor to be charged with a part of power stored in the first capacitor at the time of power supply loss of a
(Continued)

control system circuit and enables the gate drive signal to be maintained in a negative bias by power stored in the second capacitor.

9 Claims, 5 Drawing Sheets

(51) Int. Cl.
*H02M 7/538* (2007.01)
*H02M 1/36* (2007.01)
*H02M 3/335* (2006.01)
*H02M 7/48* (2007.01)

(52) U.S. Cl.
CPC .......... *H02M 7/4826* (2013.01); *H02M 7/538* (2013.01); *H02M 7/5375* (2013.01)

(56) References Cited

U.S. PATENT DOCUMENTS

2016/0380575 A1* 12/2016 Tsumura ............... F25B 49/025
 318/478
2017/0125657 A1* 5/2017 Kaibe ................... H02M 3/155

FOREIGN PATENT DOCUMENTS

| JP | 2010-148181 A | 7/2010 |
|---|---|---|
| JP | WO2013/125004 A1 | 8/2013 |
| JP | 2016-123202 A | 7/2016 |

* cited by examiner

POWER CONVERSION DEVICE

TECHNICAL FIELD

An embodiment of the present invention relates to a power conversion device.

BACKGROUND ART

A power conversion device, which includes one or more switching elements and performs power conversion between direct current (DC) power and alternating current (AC) power, is known. In this power conversion device, the power conversion may be stopped according to power supply loss of a control system circuit of the power conversion device. At this time, it may be desirable that a switching element related to the power conversion be stably controlled.

CITATION LIST

Patent Literature

[Patent Literature 1]
PCT International Publication No. WO2013/125004

SUMMARY OF INVENTION

Technical Problem

An objective of the present invention is to provide a power conversion device capable of more stably controlling a switching element related to power conversion in the case of the power conversion device stops the power conversion due to power supply loss of a control system circuit of the power conversion device.

Solution to Problem

A power conversion device of an embodiment includes a power conversion unit, a first capacitor, a gate circuit, a bypass circuit, and a discharging circuit. The power conversion unit includes a plurality of switching elements each having a gate and generates AC power from DC power supplied to a provided DC input terminal. The first capacitor is provided on a DC input side of the power conversion unit. The gate circuit includes a drive circuit configured to output a gate drive signal to be supplied to gates of one or more switching elements among the plurality of switching elements and a second capacitor configured to smooth a power supply voltage of power to be supplied to the drive circuit. The bypass circuit causes the second capacitor to be charged with a part of power stored in the first capacitor at the time of power supply loss of a control system circuit and enables the gate drive signal to be maintained in a negative bias by power stored in the second capacitor.

DESCRIPTION OF EMBODIMENTS

Hereinafter, a power conversion device of the embodiment will be described.

In the following description, a "gate drive signal" is a signal supplied to a gate as a signal for driving the gate of a switching element provided in the power conversion device. "Gate drive power" is power that enables a "gate circuit" provided in a stage previous to the switching element to supply the "gate drive signal" to the gate of the switching element at a desired voltage. The above-described desired voltage includes not only a voltage that forms a pulse but also a DC voltage in a state in which the output of the pulse has been stopped. "Gate deblocking" is a control state in which a continuous or pulsed gate drive signal for causing the switching element provided in the power conversion device to be in a conductive state is supplied to the gate so that the power conversion device is operated. "Gate blocking" is a control state in which a gate drive signal for causing the switching element provided in the power conversion device to be in a conductive state is not continuously supplied to the gate of the switching element. Therefore, in the gate blocking, the switching element continues to be in an OFF state. A "power line" in the present embodiment is a connection conductor such as a cable or a busbar.

In the present description, the term "electrically connected" may be simply referred to as "connected." Also, the term "based on XX" mentioned in the present description means "based on at least XX" and also includes a case based on another element in addition to XX. Furthermore, the term "based on XX" is not limited to a case in which XX is directly used and includes a case based on calculation or processing performed on XX. "XX" is any element (for example, any information).

Figure 1:
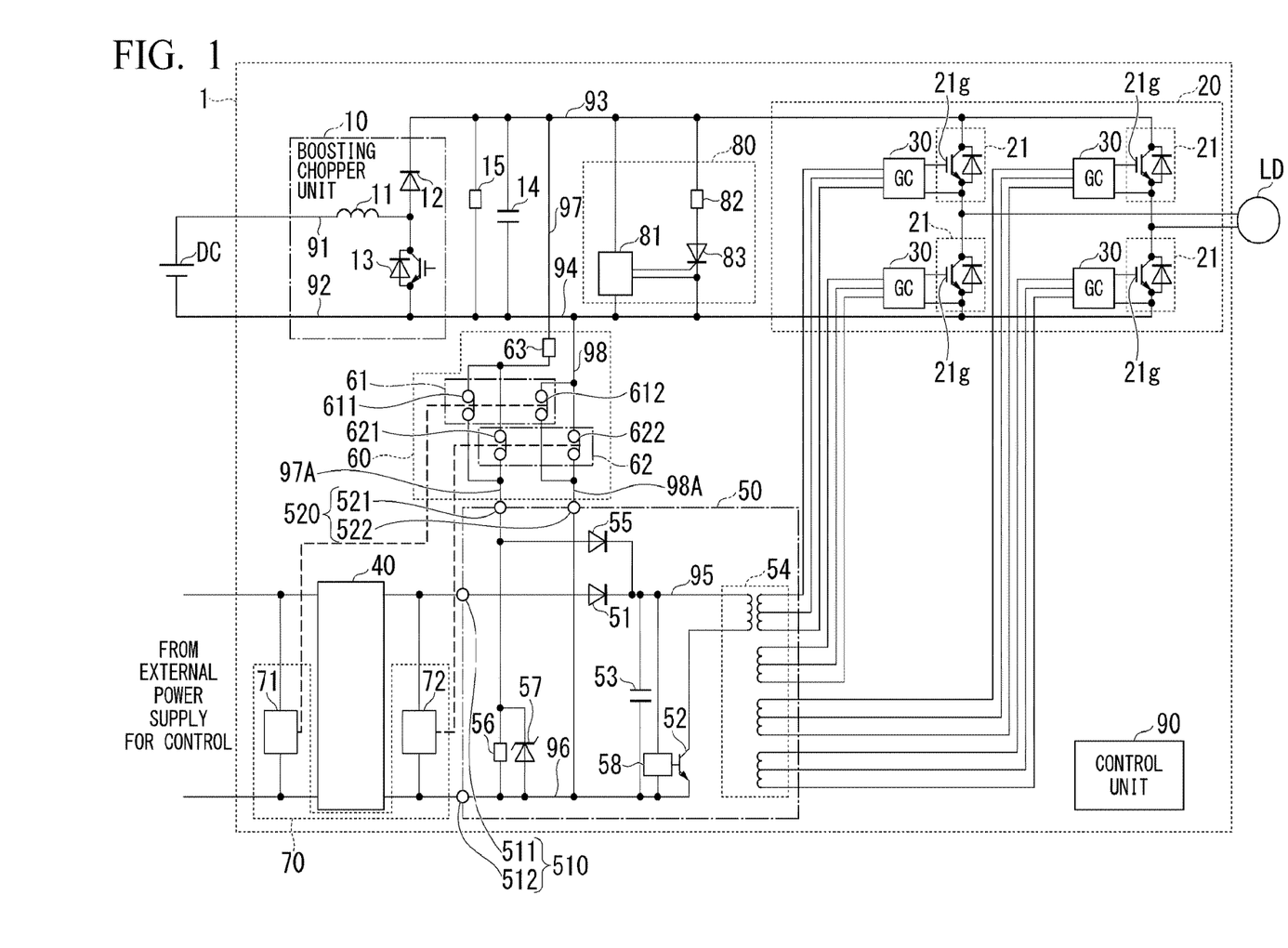
FIG. 1 is a configuration diagram showing a power conversion device according to an embodiment.

FIG. 1 is a configuration diagram showing a power conversion device 1 according to an embodiment. The power conversion device 1 shown in FIG. 1 includes, for example, a boosting chopper unit 10 (a DC power supply unit), a power conversion unit 20, a control power supply unit 40, a power distribution unit 50 (a power relay circuit), a bypass circuit 60, an undervoltage detection unit 70, a discharging circuit 80, and a control unit 90 (a control device).

A DC power supply device DC for supplying DC power is connected to a DC input terminal (an input side) of the boosting chopper unit 10. A busbar (a main circuit DC link) is connected to a DC output terminal (an output side) of the boosting chopper unit 10 and a DC input terminal (a DC input side) of the power conversion unit 20 is connected to the DC output terminal (the output side) of the boosting chopper unit 10 via the busbar. A load LD is connected to an AC output terminal (an AC output side) of the power conversion unit 20. A range from the boosting chopper unit 10 to the power conversion unit 20 is referred to as a main circuit. Also, the control power supply unit 40, the power distribution unit 50, the undervoltage detection unit 70, and the control unit 90 are referred to as a control system circuit.

The boosting chopper unit 10 includes, for example, an inductor 11, a diode 12, and a switching element 13. The boosting chopper unit 10 boosts an input voltage applied to the DC input terminal of the boosting chopper unit 10 and outputs the boosted input voltage.

The boosting chopper unit 10 may further include a capacitor 14 (a first capacitor) and a discharging resistor 15. The capacitor 14 and the discharging resistor 15 may be provided outside the boosting chopper unit 10. For example, the capacitor 14 may be provided between the boosting chopper unit 10 and the power conversion unit 20.

The capacitor 14 and the discharging resistor 15 are connected to the positive electrode terminal and the negative electrode terminal of the DC output terminal of the boosting chopper unit 10. The capacitor 14 and the discharging resistor 15 are connected in parallel to each other. A position where the capacitor 14 and the discharging resistor 15 are provided is the DC input side of the power conversion unit 20. The capacitor 14 is a smoothing capacitor. The discharging resistor 15 causes the capacitor 14 to be discharged with electric charge stored in the capacitor 14. A time constant τ1 when a discharging operation is performed via the discharging resistor 15 is defined on the basis of impedance of the discharging resistor 15 and capacitance of the capacitor 14. The above-described time constant τ1 is generally set to be relatively long.

The main circuit DC link connected to the DC output terminal of the boosting chopper unit 10 is a set of a positive electrode busbar 93 and a negative electrode busbar 94 that connect the DC output terminal of the boosting chopper unit 10 and a DC input terminal of the power conversion unit 20. For example, a rated voltage of the main circuit DC link is assumed to be DC 400 V. The voltage of the main circuit DC link is denoted by VM.

The DC input terminal of the power conversion unit 20 is connected to the main circuit DC link. The power conversion unit 20 generates AC power from DC power supplied to the DC input terminal of the power conversion unit 20. The power conversion unit 20 supplies the generated AC power to the load LD.

For example, the power conversion unit 20 includes a plurality of switching elements 21 and a gate circuit 30. For example, the power conversion unit 20 includes two pairs of legs in which two switching elements 2 are cascade-connected. Such a power conversion unit 20 is referred to as a single-phase inverter. The configuration of the power conversion unit 20 shown in FIG. 1 shows an example thereof and is not limited to the example, and may have another form. For example, although the number of switching elements is different from that described above, the power conversion unit 20 may be of a three-phase type.

For example, each switching element 21 is a power semiconductor such as an insulated gate bipolar transistor (IGBT) or a metal-oxide-semiconductor field-effect transistor (MOSFET). The switching element 21 includes a SiC-MOSFET or the like using silicon carbide (SiC). For example, the gate circuit 30 to be described below can cause the OFF state of the switching element 21 to be stabilized by applying a negative bias to a gate 21g that is a control terminal of the switching element 21. In the following description, the IGBT will be described as an example.

The gate circuit 30 is provided in correspondence with the switching element 21 of the power conversion unit 20. The gate circuit 30 receives a gate pulse supplied from the control unit 90 to be described below and supplies the gate drive signal of the switching element 21 to the switching element 21.

Also, the gate circuit 30 may be formed separately from the power conversion unit 20. The gate circuit 30 may supply the gate drive signal of each switching element 21 to the plurality of switching elements 21.

A reference potential of each gate circuit 30 becomes a potential equivalent to that of a terminal of an emitter side of the switching element 21 corresponding thereto. For example, the gate circuit 30 causes a logical value of the gate drive signal to match a logical value of the gate pulse supplied from the control unit 90. The gate circuit 30 supplies a high (H) level gate drive signal to the switching element 21 when the switching element 21 is turned on and supplies a low (L) level gate drive signal to the switching element 21 when the switching element 21 is turned off. Also, the gate drive signal of the embodiment is a bipolar signal. The gate circuit 30 causes the gate 21g of the switching element 21 to be biased to a negative voltage by supplying the L level gate drive signal to the switching element 21. Thereby, the noise resistance of the power conversion unit 20 is improved.

The gate circuit 30 generates positive and negative power supplies for generating the above-described bipolar gate drive signal inside the gate circuit 30. A specific example of the gate circuit 30 will be described below. Also, the illustration of a signal line from the control unit 90 to the gate circuit 30 is omitted.

The control power supply unit 40 supplies gate drive power to each gate circuit 30 via the power distribution unit 50 to be described below. The control power supply unit 40 converts, for example, power from an external power supply for control (not shown) and supplies the converted power to an output side of the control power supply unit 40. For example, the rated voltage of the power generated by the control power supply unit 40 is assumed to be DC 100 V.

For example, the power distribution unit 50 includes a first DC input terminal pair 510 connected to the control power supply unit 40 and a second DC input terminal pair 520 connected to the bypass circuit 60.

The first DC input terminal pair 510 includes a first positive electrode terminal 511 and a first negative electrode terminal 512. A positive electrode terminal on the output side of the control power supply unit 40 is connected to the first positive electrode terminal 511. A negative electrode terminal on the output side of the control power supply unit 40 is connected to the first negative electrode terminal 512.

For example, the power distribution unit 50 receives power supplied from the control power supply unit 40. The power distribution unit 50 relays the power via the insulation circuit and distributes a part of the power supplied from the control power supply unit 40 to each gate circuit 30. The power distribution unit 50 supplies the above-described distributed power to the gate circuit 30 of a distribution destination as the gate drive power of the gate circuit 30. As described above, the power distribution unit 50 is an example of the power relay circuit.

The second DC input terminal pair 520 includes a second positive electrode terminal 521 (a positive electrode of the input terminal) and a second negative electrode terminal 522 (a negative electrode of the input terminal). A positive electrode busbar 97A of the bypass circuit 60 to be described below is connected to the second positive electrode terminal 521. A negative electrode busbar 98A of the bypass circuit 60 is connected to the second negative electrode terminal 522.

The power distribution unit 50 may receive power supplied from the main circuit side via the bypass circuit 60 connected to the second DC input terminal pair 520. The power distribution unit 50 distributes a part of the power supplied via the bypass circuit 60 as in the case of the control power supply unit 40 described above.

For example, the power distribution unit 50 includes a diode 51, a switching element 52, a capacitor 53, an insulating high-frequency transformer 54, a diode 55, a resistor 56, a constant voltage diode 57, a transmitter 58 (a fourth detection unit), a positive electrode busbar 95, and a negative electrode busbar 96. The insulating high-frequency transformer 54 is an example of an insulation circuit.

The first positive electrode terminal 511 is connected to an anode of the diode 51. A cathode of the diode 51 is connected to a first terminal of a primary winding of the insulating high-frequency transformer 54 via the positive electrode busbar 95.

The second positive electrode terminal 521 is connected to the anode of the diode 55. The second positive electrode terminal 521 is an example of a "connection point." The cathode of the diode 55 is connected to the first terminal of the primary winding of the insulating high-frequency transformer 54 via the positive electrode busbar 95. Furthermore, the second positive electrode terminal 521 is connected to a cathode of the constant voltage diode 57 and a first terminal of the resistor 56. An anode of the constant voltage diode 57 and a second terminal of the resistor 56 are connected to the second negative electrode terminal 522 via the negative electrode busbar 96. For example, a Zener voltage of the constant voltage diode 57 is defined to be slightly higher than the rated voltage on the output side of the control power supply unit 40. For example, the above-described Zener voltage may be defined to be incremented by a decrement in a forward voltage of the diode 55 with respect to the rated voltage on the output side of the control power supply unit 40. The constant voltage diode 57 limits the voltage of the second positive electrode terminal 521 to a voltage which is lower than or equal to the Zener voltage of the constant voltage diode 57. Details of the operations of the resistor 56 and the constant voltage diode 57 will be described below. Also, the constant voltage diode 57 may include a constant voltage circuit configured to limit an upper limit of a voltage between terminals according to a combination of a plurality of constant voltage diodes or a combination of a relatively small capacity constant voltage diode and a relatively large capacity transistor instead of a configuration of a single constant voltage diode.

The switching element 52 may be, for example, an npn-type transistor for high-frequency switching. The first negative electrode terminal 512 and the second negative electrode terminal 522 are connected to an emitter of the switching element 52 via the negative electrode busbar 96 and a collector of the switching element 52 is connected to the second terminal of the primary winding of the insulating high-frequency transformer 54. A base drive signal including a periodic pulse is supplied from the transmitter 58 to a base of the switching element 52. The switching element 52 adjusts a current flowing through the primary side of the insulating high-frequency transformer 54 by performing switching in accordance with the pulse of the base drive signal.

The transmitter 58 generates the base drive signal including a periodic pulse based on an inter-line voltage of a secondary winding of the insulating high-frequency transformer 54. For example, the transmitter 58 adjusts a DUTY cycle of the pulse of the base drive signal of the switching element 52 so that a detected inter-line voltage becomes a desired voltage. The transmitter 58 causes the switching element 52 to perform a switching operation in the DUTY cycle. The transmitter 58 may be connected to the positive electrode busbar 95 and the negative electrode busbar 96 and use the capacitor 53 as a power supply.

The capacitor 53 is connected to the positive electrode busbar 95 and the negative electrode busbar 96. The capacitor 53 smooths a voltage applied to the positive electrode busbar 95 and the negative electrode busbar 96 described above.

The insulating high-frequency transformer 54 includes, for example, one primary winding and a plurality of secondary windings with a center tap. All of the one primary winding and the plurality of secondary windings described above are insulated from each other and magnetically coupled to each other. The primary side of the insulating high-frequency transformer 54 is connected to the capacitor 14 via the bypass circuit 60. The insulating high-frequency transformer 54 shown in FIG. 1 is an example including four secondary windings. Each secondary winding of the insulating high-frequency transformer 54 is connected to the power supply terminal of the gate circuit 30 paired with the secondary winding.

Figure 2:
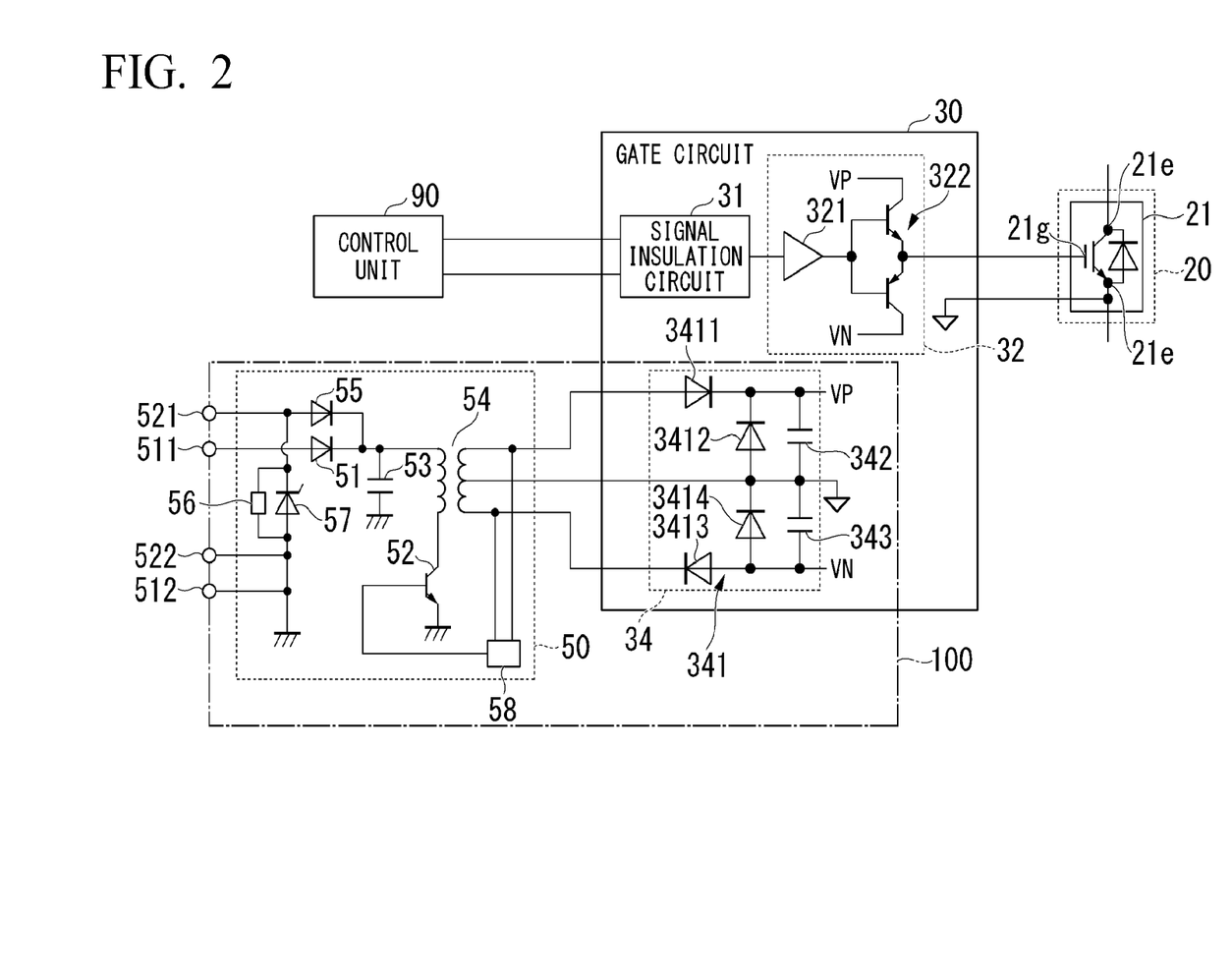
FIG. 2 is a configuration diagram showing a gate circuit according to the embodiment.

Also, a combination of the diode 51, the switching element 52, the capacitor 53, the insulating high-frequency transformer 54, and the power supply circuit 34 (FIG. 2) of the gate circuit 30 to be described below is an example of a first DC-DC converter. The above-described first DC-DC converter is applied when the power distribution unit 50 receives power supplied from the control power supply unit 40. Also, a combination of the diode 55, the switching element 52, the capacitor 53, the insulating high-frequency transformer 54, and the power supply circuit 34 is an example of a second DC-DC converter. The above-described second DC-DC converter is applied when the power distribution unit 50 receives power supplied via the bypass circuit 60 to be described below. When the first DC-DC converter and the second DC-DC converter are described without distinction, they are simply referred to as DC-DC converters 100 (FIG. 2).

The bypass circuit 60 includes, for example, a first relay 61 (a first switch), a second relay 62 (a second switch), a resistor 63 (a current limiting resistor), positive electrode busbars 97 and 97A, and negative electrode busbars 98 and 98A.

The first relay 61 is of a bipolar type and includes, for example, a positive electrode contact point 611 and a negative electrode contact point 612. Likewise, the second relay 62 is of a bipolar type and includes, for example, a positive electrode contact point 621 and a negative electrode contact point 622. The first relay 61 and the second relay 62 alternatively select whether to cause the main circuit DC link and the second DC input terminal pair 520 to be conductive or whether to cause the main circuit DC link and the second DC input terminal pair 520 to be insulated in conjunction with a detection result of the undervoltage detection unit 70 to be described below. Also, when the first relay 61 and the second relay 62 are of a single pole type, the contact point on the negative electrode side can be omitted.

The resistor 63, the contact point 611 of the first relay 61, and the contact point 621 of the second relay 62 are provided between the positive electrode busbar 97 and the positive electrode busbar 97A so that the positive electrode terminal of the capacitor 14 and the power distribution unit 50 are connected. The contact point 612 of the first relay 61 and the contact point 622 of the second relay 62 are provided between the negative electrode busbar 98 and the negative electrode busbar 98A so that the negative electrode terminal of the capacitor 14 and the power distribution unit 50 are connected.

For example, the first terminal of the contact point 611 of the first relay 61 is connected in series to a resistor 63 to be described below and is further connected to a positive electrode busbar 93 of the main circuit DC link via a positive electrode busbar 97. The second terminal of the contact point 611 is connected to the positive electrode busbar 97A, further connected to the anode of the diode 55 via the second positive electrode terminal 521, and connected to the positive electrode busbar 95 via the diode 55. The first terminal of the contact point 612 of the first relay 61 is connected to the negative electrode busbar 94 of the main circuit DC link via the negative electrode busbar 98. The second terminal of the contact point 612 is connected to the second negative electrode terminal 522 via the negative electrode busbar 98A and further connected to the negative electrode busbar 96. The first relay 61 is in a conductive state according to a signal from a voltage detector 71 to be described below.

The contact point 621 of the second relay 62 is connected in parallel to the contact point 611 of the first relay 61. The contact point 622 of the second relay 62 is connected in parallel to the contact point 612 of the first relay 61. For the detailed connection relationship of the contact points of the second relay 62, the description of the connection relationship of the contact points of the first relay 61 will be referred to. The second relay 62 is in a conductive state according to a signal from a voltage detector 72 to be described below.

According to the above-described circuit, the positive electrode of the capacitor 14 is connected to the first terminal of the contact point 611 of the first relay 61 and the first terminal of the contact point 621 of the second relay 62 via the positive electrode busbar 93 and the resistor 63 connected to the positive electrode busbar 93. Furthermore, the second terminal of the contact point 611 of the first relay 61 and the second terminal of the contact point 621 of the second relay 62 are connected to the second positive electrode terminal 521. When either the first relay 61 or the second relay 62 is turned on, the resistor 63 and the resistor 56 are connected in series and both ends thereof are connected to the positive electrode busbar 93 and the negative electrode busbar 94 of the main circuit DC link. The resistor 63 is a current limiting resistor.

The above-described bypass circuit 60 closes the contact points of the first relay 61 and the second relay 62 in accordance with the signal output from the undervoltage detection unit 70. When the contact point of one of the first relay 61 and the second relay 62 is closed, a part of power stored in the capacitor 14 is supplied to the capacitors 342 and 343 to be described below. The above-described bypass circuit 60 causes the capacitors 342 and 343 to be charged with a part of power stored in the capacitor 14 at the time of power supply loss of the control system circuit. The bypass circuit 60 enables the gate drive signal to be maintained in a negative bias by storing the power in the capacitors 342 and 343.

The undervoltage detection unit 70 detects the time of power supply loss of the control system circuit. For example, the undervoltage detection unit 70 includes the voltage detector 71 (a first detection unit) and the voltage detector 72 (a second detection unit).

The voltage detector 71 is electrically connected in parallel between the input terminals of the control power supply unit 40, detects an input voltage of the control power supply unit 40 (a voltage on the input side thereof), and detects that the input voltage of the control power supply unit 40 is less than a first threshold value. For example, the voltage detector 71 detects that there is a possibility that an amount of power to be supplied from the control power supply unit 40 to the gate circuit 30 during at least the gate deblocking will be insufficient by detecting that the input voltage of the control power supply unit 40 is less than the first threshold value. In the above-described case, the voltage detector 71 causes the first relay 61 of the bypass circuit 60 to be in a conductive state. A state in which the input voltage of the control power supply unit 40 is less than the first threshold value is an example of a detection result of power supply loss of the control system circuit.

The input side of the voltage detector 72 is electrically connected in parallel to the positive electrode terminal and the negative electrode terminal of the output side of the control power supply unit 40. The voltage detector 72 detects an output voltage of the control power supply unit 40 (a voltage on the output side thereof) and detects that the output voltage of the control power supply unit 40 is less than the second threshold value. For example, the voltage detector 72 detects that there is a possibility that an amount of power to be supplied from the control power supply unit 40 to the gate circuit 30 during at least the gate deblocking will be insufficient by detecting that the output voltage of the control power supply unit 40 is less than the second threshold value. In the above-described case, the voltage detector 72 causes the second relay 62 of the bypass circuit 60 to be in the conductive state. The state in which the output voltage of the control power supply unit 40 is less than the second threshold value is an example of a detection result of power supply loss of the control system circuit.

As described above, the undervoltage detection unit 70 detects that the amount of power supplied from the control power supply unit 40 to at least the gate circuit 30 is insufficient on the basis of either the input voltage or the output voltage of the control power supply unit 40. Thereby, the undervoltage detection unit 70 detects a state in which the gate drive power is insufficient. The bypass circuit 60 causes the bypass circuit 60 to be conductive by causing the contact point of the first relay 61 or the second relay 62 of the bypass circuit 60 to be in the conductive state on the basis of a detection result of the undervoltage detection unit 70.

The discharging circuit 80 includes, for example, a voltage detector 81 (a third detection unit), a current limiting resistor 82 (a discharging resistor), and a discharging semiconductor switch 83 (a third switch).

The voltage detector 81 is connected between both electrodes of the main circuit DC link, receives operation power from the main circuit DC link, and detects a potential difference (a voltage VM) between the positive electrode busbar 93 and the negative electrode busbar 94 of the main circuit DC link. The potential difference between the positive electrode busbar 93 and the negative electrode busbar 94 becomes an input voltage of the power conversion unit 20 (a voltage applied to the DC input terminal). When the undervoltage detection unit 70 detects a power shortage state of the gate drive power and the voltage VM of the main circuit DC link falls below a predetermined third threshold value, the voltage detector 81 outputs a trigger signal to the discharging semiconductor switch 83 of a subsequent stage. The above-described trigger signal is a signal for causing the discharging semiconductor switch 83 to start discharging and is an example of a discharging start signal.

Also, the voltage detector 81 causes the capacitor 14 to be discharged with power stored in the capacitor 14 while the gate drive signal is being maintained in the negative bias by power stored in the capacitors 342 and 343. For example, a timing at which the voltage detector 81 outputs the trigger signal of the discharging start signal to the discharging semiconductor switch 83 is before a state in which the gate drive signal is not maintained in a negative bias due to the lack of power stored in the capacitors 342 and 343 is reached.

The current limiting resistor 82 causes the capacitor 14 to be discharged with power stored in the capacitor 14. A discharging current at the time of discharging is limited by the impedance of the current limiting resistor 82 and the like.

The discharging semiconductor switch 83 is, for example, a thyristor which is in a non-conductive state at normal times and which is in a conductive state when a trigger signal is received. The discharging semiconductor switch 83 receives the trigger signal from the voltage detector 81 and is in the conductive state and causes the current limiting resistor 82 to be connected to the capacitor 14 in parallel. Thereby, the discharging semiconductor switch 83 starts discharging the capacitor 14 via the current limiting resistor 82.

As described above, a time period of discharging of the capacitor 14 with power stored in the capacitor 14 is shortened by combining discharging by the supply of a part of DC power stored in the capacitor 14 to the gate circuit 30 through the bypass circuit 60 and discharging by the discharging circuit 80.

Also, the discharging circuit 80 is not included in a distribution destination of power from the power distribution unit 50. Each part of the discharging circuit 80 is configured to function using the power of the main circuit DC link. The discharging circuit 80 as described above can cause the capacitor 14 to be discharged with power stored in the capacitor 14 in a state in which no power is supplied from the control system power supply, for example, when the voltage VM of the main circuit DC link drops to a predetermined voltage.

A more specific example of the gate circuit will be described with reference to FIG. 2. FIG. 2 is a configuration diagram showing the gate circuit 30 according to the embodiment.

The gate circuit 30 includes, for example, a signal insulation circuit 31, a drive circuit 32, and a power supply circuit 34.

For example, a gate pulse is supplied from the control unit 90 to be described below to the gate circuit 30. The gate pulse may be modulated by, for example, pulse width modulation (PWM) control. The gate circuit 30 generates a gate drive signal based on the gate pulse through the following steps and supplies the gate drive signal to the gate 21g of the switching element 21.

The signal insulation circuit 31 includes, for example, a photocoupler (not shown) and the like and electrically insulates the input terminal side and the output terminal side. The input terminal of the signal insulation circuit 31 is connected to the output terminal of the control unit 90. The signal insulation circuit 31 generates an insulation gate signal corresponding to the gate pulse supplied from the control unit 90 and supplies the insulation gate signal to the drive circuit 32 connected to a stage subsequent to the signal insulation circuit 31. Also, the insulation gate signal is, for example, a signal having the same logical value as the gate pulse.

A positive voltage VP and a negative voltage VN are supplied from a power supply circuit 34 to be described below to the drive circuit 32. The drive circuit 32 generates a gate drive signal for driving the gate 21g of the switching element 21 as a signal within a voltage range from the negative voltage VN to the positive voltage VP.

For example, the drive circuit 32 includes a voltage amplification circuit 321 and a current amplification circuit 322. The voltage amplification circuit 321 amplifies a voltage of the insulation gate signal supplied from the signal insulation circuit 31. The current amplification circuit 322 amplifies a current of the insulation gate signal whose voltage has been amplified by the voltage amplification circuit 321, generates a gate drive signal based on the insulation gate signal, and outputs the gate drive signal. For example, the current amplification circuit 322 includes a push-pull type circuit of complementary transistors. Thereby, the gate circuit 30 outputs a gate drive signal of positive polarity when the gate pulse is at a high level. Also, when the gate pulse during the gate blocking is at a low level, the gate circuit 30 sets the gate drive signal in the negative bias state and the switching element 21 can be reliably turned off.

The power supply circuit 34 generates at least power to be supplied to the drive circuit 32 on the basis of the power distributed from the power distribution unit 50. The power supply circuit 34 generates, for example, a positive voltage VP and a negative voltage VN with respect to a reference potential.

For example, the power supply circuit 34 includes a rectification unit 341 (a rectification circuit) and capacitors 342 and 343 (second capacitors). For example, the rectification unit 341 is a half-wave rectification circuit including four diodes. The rectification unit 341 is connected to one secondary winding of the insulating high-frequency transformer 54.

For example, the rectification unit 341 includes diodes 3411, 3412, 3413, and 3414. The rectification unit 341 forms a half-wave rectification circuit and rectifies the current induced in the secondary winding of the insulating high-frequency transformer 54 according to the switching of the switching element 52. The rectification unit 341 generates a positive voltage VP according to half-wave rectification using the diodes 3411 and 3412 and generates a negative voltage VN according to half-wave rectification using the other two diodes 3413 and 3414.

The capacitor 342 absorbs a change in the voltage generated by the rectification of the rectification unit 341 and smooths the positive voltage VP of the secondary side voltage of the insulating high-frequency transformer 54. The capacitor 343 absorbs a change in the voltage generated by the rectification of the rectification unit 341 and smooths the negative voltage VN of the secondary side voltage of the insulating high-frequency transformer 54. These capacitors 342 and 343 smooth the positive voltage VP and the negative voltage VN, which are power supply voltages of the power supplied to the drive circuit 32 and store the power.

Also, capacitances of the capacitors 342 and 343 are defined as capacitances exceeding capacitance for enabling a desired voltage to be supplied during a period until a desired period elapses from the stop of the supply of power from the rectification unit 341. A period in which the capacitors 342 and 343 supply the desired voltage is defined to be longer than a discharge time constant τ2 of the discharging circuit 80 to be described below. The details of the above will be described below.

Also, as described above, the power supply circuit 34 acts as the DC-DC converter 100 in combination with the power distribution unit 50. The DC-DC converter 100 supplies the positive voltage VP and the negative voltage VN on the basis of gate drive power supplied to the power distribution unit 50.

For example, the power distribution unit 50 adjusts the current of the primary winding of the insulating high-frequency transformer 54 on the basis of the voltage of the secondary winding of the insulating high-frequency transformer 54 detected by a detector (not shown). Even if the voltage on the primary winding side of the insulating high-frequency transformer 54 changes, the power supply circuit 34 can supply the positive voltage VP and the negative voltage VN which are desired voltages when the adjustment is performed as described above if a magnitude of the change is within a permissible change range.

Thereby, the gate drive signal supplied from the gate circuit 30 to the power conversion unit 20 has a voltage within a range from the negative voltage VN having a negative potential with respect to the reference voltage to the positive voltage VP having a positive potential. Also, the reference potential of the gate circuit 30 is set for each gate circuit 30. For example, the reference potential of the gate circuit 30 is the potential of an emitter 21e of the switching element 21 of the power conversion unit 20 corresponding to the gate circuit 30.

Figure 3:
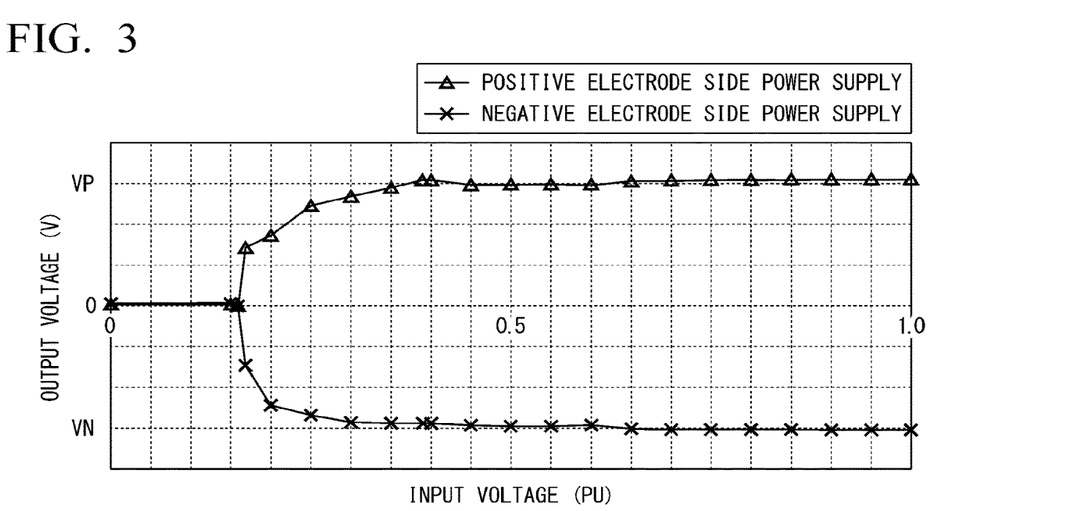
FIG. 3 is a diagram for describing the stability of an output voltage with respect to a change in an input voltage of a DC-DC converter according to the embodiment.

The stability of an output voltage with respect to an input voltage change of the DC-DC converter 100 will be described with reference to FIG. 3. FIG. 3 is a diagram for describing the stability of an output voltage with respect to a change in an input voltage of the DC-DC converter 100 according to the embodiment. The input voltage of the DC-DC converter 100 is a voltage supplied to the input side of the power distribution unit 50. The output voltage of the DC-DC converter 100 is a voltage supplied to the drive circuit 32 of the gate circuit 30.

In the graph shown in FIG. 3, the input voltage of the DC-DC converter 100 is plotted on the horizontal axis, the output voltage of the DC-DC converter 100 is plotted on the vertical axis, and a relationship between an input and an output is shown in a state in which the gate pulse is supplied to the switching element 21. The input voltage shown in FIG. 3 is standardized and the rated input voltage is represented by 1 PU. When the input voltage is changed from 1 PU to 0 PU, the output voltage does not change significantly from 1 PU to about 0.5 PU, and predetermined voltages (the positive voltage VP and the negative voltage VN) are output. When the input voltage is further reduced to about 0.3 PU, the deviation of the output voltage from a defined voltage increases. When the input voltage is further reduced to less than 0.2 PU, the output voltage cannot be generated and the output voltage becomes 0 PU.

Also, the characteristics different from those shown in FIG. 3 may be provided according to the configuration of the DC-DC converter 100, the power consumption of the gate circuit 30, and the like. A resistance value and various types of determination values may be defined on the basis of characteristics required for the DC-DC converter 100.

Figure 4:
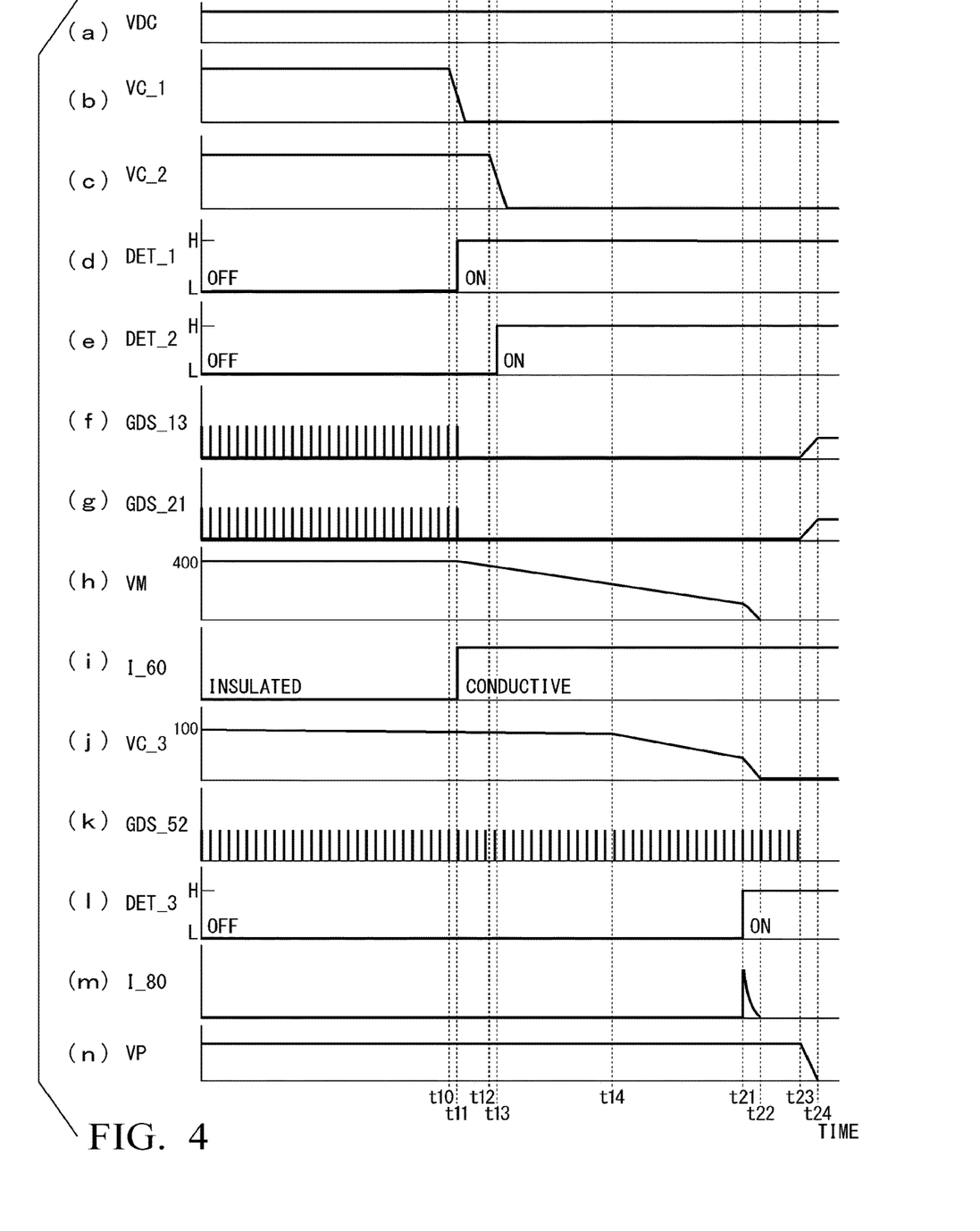
FIG. 4 is a timing chart showing an operation of the power conversion device according to the embodiment.

The operation of the power conversion device 1 according to the embodiment will be described with reference to FIG. 4. FIG. 4 is a timing chart for describing the operation of the power conversion device 1 according to the embodiment. A graph of a voltage (VDC) supplied from the DC power supply device DC to the boosting chopper unit 10 is shown in (a) of FIG. 4. A graph of an input voltage (VC_1) of the control power supply unit 40 is shown in (b) of FIG. 4. A graph of an output voltage (VC_2) of the control power supply unit 40 is shown in (c) of FIG. 4. A detection result (DET_1) of the voltage detector 71 is shown in (d) of FIG. 4. A case in which the detection result (DET_1) is less than a predetermined first threshold value is indicated by the H level. A detection result (DET_2) of the voltage detector 72 is shown in (e) of FIG. 4. A case in which the detection result (DET_2) is less than a predetermined second threshold value is indicated by the H level.

A gate drive signal (GDS_13) supplied to the boosting chopper unit 10 is shown in (f) in FIG. 4. A gate drive signal (GDS_21) supplied to the power conversion unit 20 is shown in (g) in FIG. 4. A graph of a voltage VM of the main circuit DC link is shown in (h) in FIG. 4. A state (I_60) of the bypass circuit 60 is binarized into a conductive state and an insulated state in (i) of FIG. 4. An ON state of the contact point corresponds to a case in which the detection result of either the voltage detector 71 or the voltage detector 72 is at the H level. In (j) of FIG. 4, a voltage (VC_3) generated between the terminals of the capacitor 53 charged with power after the power is supplied from the control power supply unit 40 or the bypass circuit 60 to the input side of the power distribution unit 50 is shown. Hereinafter, a voltage generated between the terminals of the capacitor 53 will be referred to as the input voltage VC_3 of the power distribution unit 50. A state of the base drive signal (GDS_52) supplied to the switching element 52 is shown in (k) of FIG. 4. A detection result (DET_3) of the voltage detector 81 is shown in (l) of FIG. 4. A discharging current (I_80) of the discharging circuit 80 is shown in (m) of FIG. 4. A voltage VP generated in the gate circuit 30 is shown in (n) of FIG. 4. The illustration of the voltage VN in FIG. 4 is omitted. A voltage VN shows a trend similar to that of the voltage VP and has polarity different from that of the voltage VP.

A process at the time of gate drive power loss of the power conversion device 1 from time t10 to time t24 shown in FIG. 4 will be described. In the initial state shown in FIG. 4, the power conversion device 1 is in operation (gate deblocking). Until time t10, the states of the signals are as follows.

DC power is supplied from the DC power supply device DC to the main circuit of the power conversion device 1. As shown in (a) of FIG. 4, the voltage supplied from the DC power supply device DC does not significantly change within the period shown in FIG. 4.

As shown in (b) of FIG. 4, DC power is supplied to the control power supply unit 40 at a desired rated input voltage. As shown in (c) of FIG. 4, the control power supply unit 40 outputs a rated output voltage. For example, a first threshold value lower than the rated input voltage of the control power supply unit 40 and a second threshold value lower than the rated output voltage of the control power supply unit 40 are defined. The voltage detector 71 detects that the input voltage of the control power supply unit 40 is higher than the first threshold value and the contact points 611 and 612 of the first relay 61 are turned off (OFF) as shown in (d) of FIG. 4. The voltage detector 72 detects that the output voltage of the control power supply unit 40 is higher than the second threshold value and the contact points 621 and 622 of the second relay 62 are turned off (OFF) as shown in (e) of FIG. 4.

As shown in (f) of FIG. 4, a pulsed gate drive signal is periodically supplied from the control unit 90 to the boosting chopper unit 10. The boosting chopper unit 10 performs power conversion. As shown in (g) of FIG. 4, a pulsed gate drive signal is periodically supplied from the gate circuit 30 to the power conversion unit 20. The power conversion unit 20 performs power conversion.

As shown in (h) of FIG. 4, the voltage VM of the main circuit DC link is a rated value. It is assumed that the rated value of the voltage VM of the main circuit DC link is, for example, 400 V. As shown in (i) of FIG. 4, the state of the bypass circuit becomes the insulated state. As shown in (j) of FIG. 4, the input voltage VC_3 of the power distribution unit 50 has a rated value corresponding to the rated output voltage of the control power supply unit 40. As shown in (k)

of FIG. 4, a pulsed base drive signal is periodically supplied from the transmitter 58 to the switching element 52.

As shown in (l) of FIG. 4, the voltage VM of the main circuit DC link is greater than or equal to the third threshold value. As shown in (m) of FIG. 4, there is no current flowing through the discharging circuit 80. As shown in (n) of FIG. 4, the voltage of the gate circuit 30 becomes a desired voltage.

Here, it is assumed that an event in which the input voltage of the control power supply unit 40 is lost occurs at time t10 and the event continues. It is detected that the input voltage of the control power supply unit 40 starts to decrease from time t10 and decreases from the rated voltage at time t11 ((b) in FIG. 4). In this case, the voltage detector 71 detects that the input voltage of the control power supply unit 40 is less than the first threshold value. The voltage detector 71 turns on (ON) the contact points 611 and 612 of the first relay 61 as shown in (d) of FIG. 4 (time t11). Thereby, as shown in (i) of FIG. 4, the main circuit side and the power supply circuit side for the gate circuit are electrically connected through the bypass circuit 60. Power supply from the capacitor 14 to the input side of the power distribution unit 50 starts through the bypass circuit 60.

Also, even if the input voltage of the control power supply unit 40 is lost, the output voltage of the control power supply unit 40 does not immediately decrease because power stored in the capacitor (not shown) provided within the control power supply unit 40 is present generally. Also, even if the input voltage of the control power supply unit 40 is lost, the input voltage of the power distribution unit 50 does not immediately decrease due to power stored in the capacitor 53.

Also, although a response delay may actually occur in the first relay 61 or the like, the response delay is regarded as 0 as shown in FIG. 4. For example, capacitance, which compensates for the influence of the response delay of the first relay 61 or the like, may be provided in a capacitor after the power distribution unit 50.

Also, the control unit 90 acquires the detection result of the voltage detector 71 and identifies that the input voltage of the control power supply unit 40 is lower than the first threshold value on the basis of the detection result of the voltage detector 71. In response to this, the control unit 90 performs gate blocking on the boosting chopper unit 10 and the power conversion unit 20, as shown in (f) and (g) of FIG. 4, so that the supply of the signal including the gate pulse of the switching element 13 and the switching element 21 is stopped. According to the above-described gate blocking, the boosting chopper unit 10 and the power conversion unit 20 stop power conversion.

Also, after the input voltage of the control power supply unit 40 decreases from the rated voltage, the output voltage of the control power supply unit 40 also decreases as shown in (c) of FIG. 4. For example, it is detected that the output voltage of the control power supply unit 40 starts to decrease from time t12 and decreases from the rated voltage at time t13 ((c) in FIG. 4). Thereby, the gate drive power is not supplied from the control power supply unit 40 to the power distribution unit 50 (time t12). Also, at this point, power has already been supplied from the capacitor 14 to the power distribution unit 50 through the first relay 61 of the bypass circuit 60.

As shown in (e) of FIG. 4, the voltage detector 72 detects that the output voltage of the control power supply unit 40 is less than the second threshold value and turns on (ON) the contact points 621 and 622 of the second relay 62 (time t13). Although the main circuit side and the power supply circuit side for the gate circuit have already been electrically connected through the first relay 61 of the bypass circuit 60, the main circuit side and the power supply circuit side for the gate circuit are electrically connected through the second relay 62 as in the first relay 61.

Also, the voltage VM of the main circuit DC link at the above-described step is almost at the rated voltage of the main circuit DC link and is sufficiently higher than a rated voltage or an actual output voltage on the output side of the control power supply unit 40. Thus, the first relay 61 and the second relay 62 are brought into a conductive state and a current flows from the capacitor 14 to the power distribution unit 50 through the resistor 63 of the bypass circuit 60. Thereby, a part of power is supplied from the capacitor 14 to the power distribution unit 50 through the bypass circuit 60. The power distribution unit 50 supplies power, which has been supplied from the capacitor 14 to the power distribution unit 50, from the power distribution unit 50 to the gate circuit 30 and causes the capacitor of the gate circuit 30 to be charged with the supplied power. Thereby, the power distribution unit 50 enables the power supplied from the capacitor 14 to be used as the gate drive power.

Also, when the power is supplied from the capacitor 14 to the power distribution unit 50 through the bypass circuit 60, the upper limit of the voltage of the second positive electrode terminal 521 is limited to the rated value by the constant voltage diode 57. As described above, even if the input voltage of the control power supply unit 40 is lost at the time t10, the input voltage VC_3 of the power distribution unit 50 is also maintained at the rated value after time t10 as shown in (j) of FIG. 4.

Here, the voltage of the second positive electrode terminal 521 related to the input voltage VC_3 of the power distribution unit 50 will be described. The constant voltage diode 57 becomes conductive when a reverse bias is applied at a voltage higher than or equal to the Zener voltage. Thus, the voltage of the second positive electrode terminal 521 based on the potential of the negative electrode busbar 96 becomes the Zener voltage of the constant voltage diode 57 due to the action of the constant voltage diode 57. This state continues until the voltage VM of the main circuit DC link decreases after time t13 and a voltage between the terminals of the resistor 56 decreases to a voltage less than or equal to the Zener voltage of the constant voltage diode 57.

When time t14 is reached, the voltage between the terminals of the resistor 56 decreases to a voltage less than or equal to the Zener voltage of the constant voltage diode 57. The constant voltage diode 57 becomes non-conductive even if a reverse bias is applied at a voltage less than or equal to the Zener voltage. Thus, in accordance with this, the constant voltage diode 57 does not limit the voltage of the second positive electrode terminal 521. Consequently, when the voltage VM of the main circuit DC link decreases, the voltage of the second positive electrode terminal 521 also decreases according to the decrease in the voltage VM. As shown in (j) in FIG. 4, the input voltage VC_3 of the power distribution unit 50 from the capacitor 14 also decreases in accordance with a change in the voltage of the second positive electrode terminal 521.

After the above-described time t14, the power supply voltages VP and VN within the gate circuit 30 also do not change as shown in (n) of FIG. 4 and the stability thereof is ensured until time t21.

Next, a process when the voltage VM of the main circuit DC link of the power conversion device 1 from time t21 to time t24 shown in FIG. 4 decreases will be described.

At time t21, it is assumed that the voltage VM of the main circuit DC link has dropped below the third threshold value.

The voltage detector 81 detects that the input voltage of the power conversion unit 20 is less than the third threshold value on the basis of the input voltage of the power conversion unit 20. As shown in (l) of FIG. 4, the detection result of the voltage detector 81 becomes the H level and the discharging semiconductor switch 83 becomes conductive (ON state). Thereby, the discharging circuit 80 starts discharging the capacitor 14 via the current limiting resistor 82 and the discharging semiconductor switch 83 (time t21).

A discharging current of the capacitor 14 increases after time t21, so that a rate of a decrease in the voltage VM of the main circuit DC link increases, the voltage VM of the main circuit DC link rapidly decreases as shown in (h) of FIG. 4, and the voltage thereof becomes 0 at time t22. Also, in accordance with the change in the voltage VM of the main circuit DC link, the input voltage VC_3 of the power distribution unit 50 also changes to 0 as shown in (j) of FIG. 4.

Thereafter, as shown in (n) of FIG. 4, the voltage VP generated by the gate circuit 30 begins to decrease (time t23) and the gate circuit 30 cannot cause the voltage of the gate drive signal to be maintained in the negative bias and the voltage VM of the gate drive signal becomes 0 (time t24).

Also, because the voltage VM of the main circuit DC link has already become almost 0 before time t23, the switching element 21 is not damaged by the residual energy of the DC link of the main circuit even if the voltage of the gate drive signal is not negatively biased or even if the switching element 21 of the power conversion unit 20 is erroneously turned on.

For example, discharging characteristics of the discharging circuit 80 for implementing the above-described discharging procedure are defined as follows. The discharging characteristics of the discharging circuit 80 include a time constant τ2 at the time of discharging, a current squared time product, and a discharging start voltage. The time constant τ2 is an example of the discharging time constant of the discharging circuit. First, the time constant τ2 during discharging will be described. For example, the time constant τ2 at the time of discharging is substantially defined on the basis of impedance of the current limiting resistor 82 and capacitance of the capacitor 14 because the impedance of the current limiting resistor 82 is sufficiently less than the impedance of the discharging resistor 15. Also, the time constant τ2 at the time of discharging is an example of the discharge time constant. The time constant τ2 is shorter than the time constant τ1 described above.

For example, it is the time constant τ2 at the time of discharging can be set to a magnitude so that electric charge of the capacitor 14 is lost by the discharging while the gate 21g of the switching element 21 of the power conversion unit 20 is being negatively biased. In other words, the magnitude of the time constant τ2 can be defined so that the voltage VM of the main circuit DC link decreases to a voltage that does not damage the switching element 21 while the gate 21g of the switching element 21 of the power conversion unit 20 is being negatively biased.

More specifically, during a period in which the capacitors 342 and 343 in the power supply circuit 34 of the gate circuit 30 continuously retain a desired voltage in a gate blocking state, the time constant τ2 is defined so that the voltage of the capacitor 14 is decreased to a predetermined voltage determined by the switching element 21. In this case, the time constant τ2 at the time of discharging is defined to be smaller than a voltage retaining time period in which the gate 21g can be maintained in the negative bias by power of the capacitors 342 and 343. If the time constant τ2 of the discharging characteristic can be defined as described above, the discharging of the capacitor 14 can be completed while the capacitors 342 and 343 are retaining the desired voltage. Accordingly, the input voltage of the power conversion unit 20 can be reduced to approximately 0 V.

Also, the current squared time product showing the characteristics of the discharging circuit 80 is defined on the basis of, for example, the voltage VM of the main circuit DC link at the start of discharging and the capacitance of the capacitor 14. The withstand capability of each element provided in a path of discharging by the discharging circuit 80 is defined to be greater than a value of the above-described current squared time product.

For example, assuming that the rated voltage of the main circuit DC link is DC 400 V, the Zener voltage of the constant voltage diode 57 is 50 V, and the discharging start voltage of the discharging circuit 80 is about 100 V, a voltage, which is about ¼ of the voltage of the main circuit DC link immediately after the operation of the power conversion unit 20 stops, becomes a discharging start voltage of the discharging circuit 80 and the current squared time product of the discharging circuit 80 can be a small value of about 1/16 as compared with when the discharging is started from DC 400 V.

Figure 5:
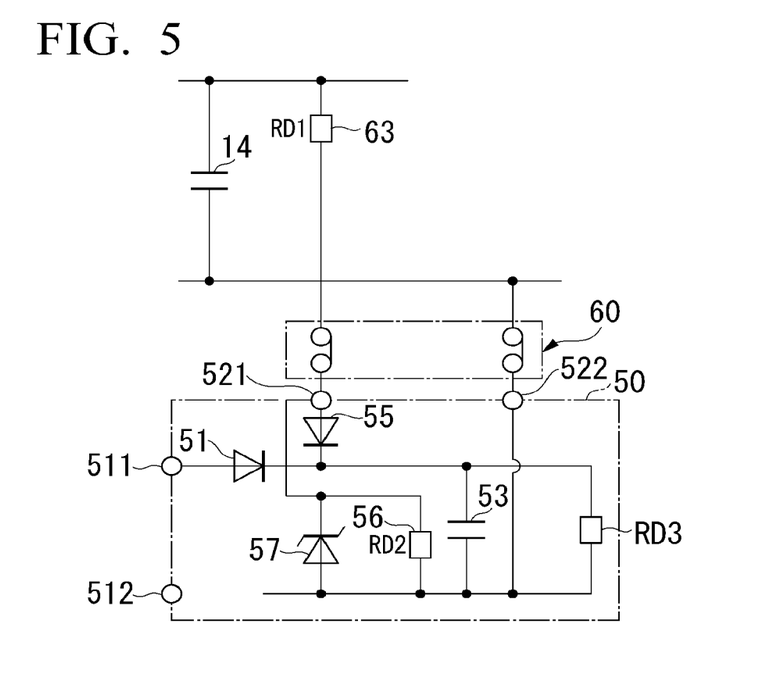
FIG. 5 is an equivalent circuit diagram for describing a voltage with which a discharging circuit is allowed to start discharging according to the embodiment.

A voltage (a third threshold value or a threshold value voltage) for causing the discharging circuit 80 of the embodiment to start discharging will be described with reference to FIG. 5. FIG. 5 is an equivalent circuit diagram for describing the voltage for causing the discharging circuit 80 of the embodiment to start discharging.

The upper side of FIG. 5 shows the main circuit DC link. The voltage of the main circuit DC link is VM as described above. The impedance of the resistor 63 is denoted by RD1. The impedance of the resistor 56 is denoted by RD2. The lower side of FIG. 5 shows a control system circuit that supplies gate drive power. A lower limit voltage of an allowable change range of the input voltage of the DC-DC converter 100 in the control system circuit is denoted by VC_3L. The input voltage of the DC-DC converter 100 corresponds to an input voltage VC_3 of the power distribution unit 50 described above.

The impedance of the equivalent load circuit equivalent to a circuit of the gate circuit 30 side viewed from the primary side of the insulating high-frequency transformer 54 in a state in which the gate circuit 30 is in the gate blocking state and the transmitter 58 is supplying the base drive signal to the switching element 52 is denoted by RD3.

Also, the discharging resistor 15 and the discharging circuit 80 provided in parallel to the capacitor 14 are omitted from the equivalent circuit shown in FIG. 5.

The contact point of the bypass circuit 60 is closed, so that the power from the capacitor 14 is supplied to the power distribution unit 50 via the bypass circuit 60 and the discharging current from the capacitor 14 flows into the second positive electrode terminal 521. Also, as a condition for the following analysis, it is assumed that the voltage between the terminals of the resistor 56 is lower than or equal to the Zener voltage of the constant voltage diode 57. Also, a drop in a forward voltage of each diode is very small and is ignored.

From the above-described relationship, the voltage VC_3L can be represented by the following Eq. (1).

$$VC\_3L = VM \times RP/(RP+RD1) \quad (1)$$

Also, RP in the above-described Eq. (1) is combined impedance when impedance RD2 and impedance RD3 are connected in parallel as shown in Eq. (2).

$$RP = (RD2 \times RD3)/(RD2 + RD3) \qquad (2)$$

The voltage VM when the voltage VC_3 becomes the voltage VC_3L, can be obtained from Eq. (3) obtained by converting the above-described Eq. (1).

$$VM = (RP + RD1) \times VC\_3L/RP \qquad (3)$$

For example, it is assumed that the voltage VC_3 has decreased to a lower limit value (for example, 50 V) of an allowable change range of the input voltage of the DC-DC converter 100. If the voltage detector 81 detects the voltage VM in this case, it is possible to start discharging by the discharging circuit 80 from a timepoint of the detection. Consequently, the third threshold value can be set a value that is not less than Eq. (3).

In the equivalent circuit shown in FIG. 5, first impedance of a circuit of a range from the second positive electrode terminal 521 to a negative electrode of the primary side of the power distribution unit 50 through the capacitor 14 and the second negative electrode terminal 522 within a circuit through which a current flows according to the power supplied from the capacitor 14 to the power distribution unit 50 is determined to be RD1. In the equivalent circuit shown in FIG. 5, RD1 may be regarded as impedance (DC resistance) of the resistor 63.

Also, in the above-described equivalent circuit, the equivalent impedance of the circuit on the gate circuit 30 side rather than the second DC input terminal pair 520 of the power distribution unit 50 is defined as RD3. Also, RD2 is the impedance of the resistor 56 of the power distribution unit 50. The equivalent impedance of RD3 described above and the impedance of the parallel circuit of RD3 and RD2 described above are examples of second impedance.

The above-described Eq. (3) includes variables from RD1 to RD3. Also, when the resistor 56 is not provided, when the magnitude of RD2 is sufficiently greater than that of RD3, or the like, RD2 may be omitted from Eq. (3) and Eq. (3) may be replaced with an equation that includes RD1 and RD3 as variables.

From the above, the third threshold value may be defined on the basis of at least the above-described first impedance and the above-described second impedance.

By using such relational equations, the discharging circuit 80 can reduce power supplied to the input side of the power conversion unit 20 to a value that does not substantially affect the switching element 21 while the negatively biased gate drive signal is being supplied from the gate circuit 30 to the power conversion unit 20.

Also, according to the above-described embodiment, the voltage VM of the main circuit DC link at the time when the discharging circuit 80 actually starts discharging is defined as a value lower than the rated voltage of the main circuit DC link.

For example, when discharging of the discharging circuit 80 is started at a point in time when a drop in the voltage has been detected by the undervoltage detection unit 70, the current squared time product of the discharging circuit 80 is defined on the basis of the rated voltage of the main circuit DC link. On the other hand, in the embodiment, the discharging current withstand capability of the discharging circuit 80 is defined on the basis of the current squared time product based on the voltage VM of the main circuit DC link determined on the basis of the voltage VC_3. As the voltage VM of the main circuit DC link determined on the basis of the voltage VC_3 decreases, the withstand capability of the discharging circuit 80 can decrease.

According to the above-described embodiment, the discharging circuit 80 causes discharging to be rapidly completed when discharging of the capacitor 14 starts if the voltage detector 81 detects that the voltage VM of the main circuit DC link is less than the above-described third threshold value after the power is supplied to the gate circuit 30 through at least the bypass circuit 60. According to the completion of the discharging, there is no power left in the capacitor 14 to damage the switching element 21. The power conversion device 1 can stop power conversion at the time of power supply loss of the control system circuit of the power conversion device 1.

Also, the undervoltage detection unit 70 may detect that an amount of power supplied from the control power supply unit 40 to at least the gate circuit 30 is insufficient when the input voltage to the control power supply unit 40 is less than the first threshold value. Thereby, it is possible to detect that the amount of power supplied to the gate circuit 30 is insufficient before detecting that by detecting the output voltage of the control power supply unit 40. Also, the first threshold value can be determined to be a value larger than a lower limit value of the allowable change range of the input voltage of the control power supply unit 40 and smaller than a lower limit value of a change in a power supply voltage of an external power supply for control.

Furthermore, when the voltage detector 71 detects that the input voltage to the control power supply unit 40 is less than the first threshold value, the first relay 61 of the bypass circuit 60 causes the contact point 611 provided on the positive electrode busbar 97 and the contact point 612 provided on the negative electrode busbar 98 to be conductive. Due to the above-described conductive state, a part of DC power stored in the capacitor 14 is supplied to the gate circuit 30. Thereby, the gate circuit 30 can supply the gate drive signal to the power conversion unit 20 so that a state in which the amount of electric power supplied to the gate circuit 30 is insufficient is not reached according to the DC power stored in the capacitor 14.

Also, the undervoltage detection unit 70 may detect that the amount of power supplied from the control power supply unit 40 to at least the gate circuit 30 is insufficient when the output voltage from the control power supply unit 40 is less than the second threshold value. Thereby, it is possible to detect that the amount of power supplied to the gate circuit 30 is insufficient due to a failure of the control power supply unit 40 or the like as well as a case in which the power input to the control power supply unit 40 is lost. Also, the second threshold value can be determined to be a value related to the lower limit value of the allowable change range of the output voltage of the control power supply unit 40. The value related to the lower limit value of the allowable change range of the output voltage of the control power supply unit 40 can be a value which is a predetermined magnitude smaller than the lower limit value of the allowable change range of the output voltage of the control power supply unit 40 and be determined to be a value which is less than or equal to the above-described lower limit value and greater than or equal to the voltage VC_3L.

Furthermore, when the voltage detector 72 detects that the output voltage from the control power supply unit 40 is less than the second threshold value, the second relay 62 of the bypass circuit 60 can eliminate a state in which an amount of power supplied to the gate circuit 30 is insufficient by causing the contact point 621 provided on the positive electrode busbar 97 and the contact point 622 provided on the negative electrode busbar 98 to be conductive. Thereby, a part of the DC power stored in the capacitor 14 can be supplied to the gate circuit 30 and the gate circuit 30 can supply the gate drive signal to the power conversion unit on the basis of the DC power stored in the capacitor 14.

Also, the control unit 90 stops the supply of power from the boosting chopper unit 10 to the power conversion unit 20 when it is detected that the input voltage of the control power supply unit 40 is less than the first threshold value or when it is detected that the output voltage from the control power supply unit 40 is less than the second threshold value and it is identified that the power supplied from the control power supply unit 40 to the gate circuit 30 is insufficient. The discharging resistor 15 causes the capacitor 14 to be discharged with the power stored in the capacitor 14. As a result, the input voltage of the power conversion unit 20 gradually decreases. The third threshold value for use in a process of applying the input voltage of the power conversion unit 20 is defined as a value less than the rated value of the output voltage of the control power supply unit 40.

First Modified Example of Embodiment

A first modified example of the embodiment will be described. The power distribution unit 50 of the above-described embodiment includes the insulating high-frequency transformer 54 that is insulated inside the power distribution unit 50.

Alternatively, in the present modified example, the gate circuit 30 includes an insulating high-frequency transformer, and relays power via the insulating high-frequency transformer. Accordingly, the insulating high-frequency transformer 54 of the power distribution unit 50 is omitted.

The insulating high-frequency transformer in the gate circuit 30 has a primary winding and a secondary winding. The primary winding and the secondary winding of the insulating high-frequency transformer are magnetically coupled. The primary winding of the insulating high-frequency transformer in the gate circuit 30 is connected to the input-side positive electrode busbar 95 of the power distribution unit 50. The power supply circuit 34 is connected to the secondary winding of the insulating high-frequency transformer.

Although a unit for insulating an electronic circuit power supply is different, the modified example of the embodiment described above has effects similar to those of the first embodiment.

Second Modified Example of Embodiment

A second modified example of the embodiment will be described. The power distribution unit 50 of the above-described embodiment includes the insulating high-frequency transformer 54 that is insulated inside the power distribution unit 50. Alternatively, in the present modified example, the gate circuit 30 further includes an insulating high-frequency transformer and relays power via the insulating high-frequency transformer. Accordingly, the insulating high-frequency transformer 54 of the power distribution unit 50 is omitted.

The transformer includes a winding that detects a current flowing through the busbar and the busbar and the winding are insulated from each other. In the transformer in the gate circuit 30, the busbar and the winding (a secondary winding) are magnetically coupled. For example, the above-described busbar is a positive electrode busbar 95 on the input side of the power distribution unit 50. The input of the power supply circuit 34 is connected to the winding of the transformer 36.

The positive electrode busbar 95 on the input side of the power distribution unit 50 is externally extended and a plurality of transformers as described above are provided at an extension destination thereof. A high-frequency current flowing through the positive electrode busbar 95 on the input side of the power distribution unit 50 is converted by the transformer within each gate circuit 30 and the power is distributed to each gate circuit 30.

Although a unit for insulating an electronic circuit power supply is different, the modified example of the embodiment described above has effects similar to those of the first embodiment.

According to at least one embodiment described above, the bypass circuit causes the second capacitor to be charged with a part of the power stored in the first capacitor at the time of power supply loss of the control system circuit and enables the gate drive signal to be maintained in a negative bias by power stored in the second capacitor. In case of the second detection unit detects that the voltage VM of the main circuit DC link has dropped below the third threshold value after the power was supplied to the gate circuit through at least the bypass circuit, the discharging circuit causes the first capacitor to be discharged with power stored in the first capacitor in a state in which the gate drive signal is maintained in a negative bias by power stored in the second capacitor. Thereby, the power conversion device can more stably control the switching element related to the power conversion in the case of the power conversion device stops the power conversion due to the loss of power supply of the control system circuit of the power conversion device.

At least a part of the above-described power conversion device may be implemented by a software function unit that functions when a processor such as a CPU executes a program or all thereof may be implemented by a hardware function unit such as an LSI circuit.

While several embodiments of the present invention have been described, these embodiments have been presented by way of example only, and are not intended to limit the scope of the inventions. These embodiments may be embodied in a variety of other forms. Various omissions, substitutions, and changes may be made without departing from the spirit of the inventions. The inventions described in the accompanying claims and their equivalents are intended to cover such embodiments or modifications as would fall within the scope and spirit of the inventions.

For example, the control unit 90 may control the bypass circuit 60, the discharging circuit 80, and the like on the basis of a detection result of each voltage detector and the like.

REFERENCE SIGNS LIST

1 Power conversion device
10 Boosting chopper unit (DC power supply unit)
14 Capacitor (first capacitor)
13, 21, 52 Switching element
20 Power conversion unit (power conversion unit)
30 Gate circuit
40 Control power supply unit
50 Power distribution unit (power relay circuit)
58 Transmitter (fourth detection unit)
60 Bypass circuit
70 Undervoltage detection unit
71 Voltage detector (first detection unit)
72 Voltage detector (second detection unit)

80 Discharging circuit
81 Voltage detector (third detection unit)
83 Discharging semiconductor switch
90 Control unit
91, 93, 95, 97 Positive electrode busbar (power line)
92, 94, 96, 98 Negative electrode busbar (power line)
100 DC-DC converter
342, 343 Capacitor (second capacitor)

The invention claimed is:

1. A power conversion device comprising:
a power conversion unit including a switching element having a gate and configured to generate alternating current (AC) power from direct current (DC) power supplied to a provided DC input terminal;
a first capacitor provided on a DC input side of the power conversion unit;
a gate circuit including a drive circuit configured to output a gate drive signal to be supplied to the gate of the switching element and a second capacitor configured to smooth a power supply voltage of power to be supplied to the drive circuit;
a bypass circuit configured to cause the second capacitor to be charged with a part of power stored in the first capacitor at the time of power supply loss of a control system circuit and enable the gate drive signal to be maintained in a negative bias by power stored in the second capacitor; and
a discharging circuit configured to cause the first capacitor to be discharged with the power stored in the first capacitor in a state in which the gate drive signal is maintained in the negative bias by the power stored in the second capacitor.

2. The power conversion device according to claim 1, further comprising a power relay circuit including an insulation circuit configured to insulate a primary side from a secondary side and configured to relay power via the insulation circuit,
wherein the primary side of the insulation circuit is connected to the first capacitor via the bypass circuit and the secondary side of the insulation circuit is connected to the second capacitor of the gate circuit.

3. The power conversion device according to claim 2, further comprising:
a control power supply unit configured to supply power to the gate circuit; and
a first detection unit configured to detect that an input voltage to the control power supply unit is less than a first threshold value,
wherein the bypass circuit includes a first switch having a first contact point provided between the first capacitor and the relay circuit, and
wherein the first switch closes the first contact point when the first detection unit detects that the input voltage to the control power supply unit is less than the first threshold value.

4. The power conversion device according to claim 2, further comprising:
a control power supply unit configured to supply power to the gate circuit via the power relay circuit; and
a second detection unit configured to detect that an output voltage from the control power supply unit is less than a second threshold value,
wherein the bypass circuit includes a second switch having a second contact point provided between the first capacitor and the relay circuit, and
wherein the second switch closes the second contact point when the second detection unit detects that the output voltage from the control power supply unit is less than the second threshold value.

5. The power conversion device according to claim 4, comprising:
a DC power supply unit configured to supply DC power to the DC input terminal of the power conversion unit;
a control device configured to stop the supply of power from the DC power supply unit to the power conversion unit at least when it is detected that the output voltage from the control power supply unit is less than the second threshold value; and
a third detection unit configured to detect a voltage applied to the DC input terminal of the power conversion unit and output a discharging start signal when a voltage applied to the DC input terminal of the power conversion unit is less than a third threshold value.

6. The power conversion device according to claim 5, wherein the discharging circuit includes
a discharging resistor configured to cause the first capacitor to be discharged with the power stored in the first capacitor;
the third detection unit configured to detect the voltage applied to the DC input terminal of the power conversion unit and output the discharging start signal when the voltage applied to the DC input terminal of the power conversion unit is less than the third threshold value; and
a third switch configured to receive the discharging start signal and cause the discharging resistor to be connected in parallel to the first capacitor.

7. The power conversion device according to claim 5, wherein the third threshold value is defined on the basis of at least first impedance of a circuit of a range from a positive electrode of an input terminal of the power relay circuit to a negative electrode of the input terminal of the power relay circuit through the first capacitor among circuits through which a current related to power supplied from the first capacitor to the power relay circuit flows and second impedance of an equivalent circuit equivalent to a circuit of the gate circuit side rather than the input terminal of the power relay circuit.

8. The power conversion device according to claim 2,
wherein the bypass circuit includes a current limiting resistor, a first switch, and a second switch,
wherein a positive electrode of the first capacitor is connected to a first terminal of a contact point of the first switch and a first terminal of a contact point of the second switch via a positive electrode busbar connected to a positive electrode of the DC input terminal of the power conversion unit and the current limiting resistor connected to the positive electrode busbar,
wherein each of a second terminal of the contact point of the first switch and a second terminal of the contact point of the second switch is connected to a connection point,
wherein the power relay circuit includes a constant voltage circuit that limits an upper limit value of a voltage of the connection point,
wherein a first terminal of the constant voltage circuit is connected to the connection point, and
wherein a second terminal of the constant voltage circuit is connected to a negative electrode of the first capacitor via a negative electrode busbar connected to a negative electrode of the DC input terminal of the power conversion unit.

9. The power conversion device according to claim 1, wherein a discharge time constant of the discharging circuit is less than a voltage retaining time period in which the gate can be maintained in a negative bias by the second capacitor.

* * * * *